(12) United States Patent
Jorgensen et al.

(10) Patent No.: US 8,050,185 B2
(45) Date of Patent: Nov. 1, 2011

(54) SAMPLING OF NETWORK TRAFFIC BASED ON CAM LOOKUP

(75) Inventors: Steven Glen Jorgensen, Newcastle, CA (US); Jonathan Edward Greenlaw, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1283 days.

(21) Appl. No.: 11/211,198

(22) Filed: Aug. 24, 2005

(65) Prior Publication Data
US 2007/0047456 A1    Mar. 1, 2007

(51) Int. Cl.
*H04J 1/16* (2006.01)
(52) U.S. Cl. ......... 370/252; 370/241; 370/401; 370/235
(58) Field of Classification Search ................... 370/497, 370/471, 389
See application file for complete search history.

(56) References Cited

U.S. PATENT DOCUMENTS

| | | | | |
|---|---|---|---|---|
| 5,841,874 | A * | 11/1998 | Kempke et al. ............... | 713/160 |
| 5,938,736 | A * | 8/1999 | Muller et al. .................. | 709/243 |
| 5,956,336 | A * | 9/1999 | Loschke et al. ............... | 370/392 |
| 6,041,042 | A * | 3/2000 | Bussiere ........................ | 370/245 |
| 6,259,620 | B1 * | 7/2001 | Kling et al. ................ | 365/49.15 |
| 6,310,860 | B1 | 10/2001 | Sheu et al. | |
| 6,324,654 | B1 | 11/2001 | Wahl et al. | |
| 6,351,143 | B1 * | 2/2002 | Guccione et al. ............... | 326/40 |
| 6,374,326 | B1 * | 4/2002 | Kansal et al. .................. | 711/108 |
| 6,618,818 | B1 | 9/2003 | Wahl et al. | |
| 6,714,977 | B1 | 3/2004 | Fowler et al. | |
| 6,738,862 | B1 * | 5/2004 | Ross et al. ..................... | 711/108 |
| 6,771,646 | B1 | 8/2004 | Sarkissian et al. | |
| 6,775,737 | B1 * | 8/2004 | Warkhede et al. ............. | 711/108 |
| 6,781,990 | B1 | 8/2004 | Puri et al. | |
| 6,791,983 | B1 | 9/2004 | Bergantino et al. | |
| 6,901,072 | B1 * | 5/2005 | Wong ............................. | 370/389 |
| 6,904,057 | B2 * | 6/2005 | Sarkinen et al. ............... | 370/469 |
| 7,031,304 | B1 * | 4/2006 | Arberg et al. .................. | 370/360 |
| 7,292,591 | B2 * | 11/2007 | Parker et al. ................... | 370/401 |
| 7,304,996 | B1 * | 12/2007 | Swenson et al. ............... | 370/394 |
| 7,359,968 | B1 * | 4/2008 | Ng et al. ........................ | 709/224 |
| 7,385,984 | B2 * | 6/2008 | Parker et al. ................... | 370/392 |
| 7,389,359 | B2 * | 6/2008 | Jain et al. ....................... | 709/238 |
| 7,391,739 | B1 * | 6/2008 | Taylor et al. ................... | 370/253 |
| 7,617,365 | B2 * | 11/2009 | Zhang et al. ................... | 711/141 |
| 7,636,369 | B2 * | 12/2009 | Wong ............................. | 370/419 |
| 2002/0075809 | A1 * | 6/2002 | Phaal ............................. | 370/245 |
| 2003/0196081 | A1 * | 10/2003 | Savarda et al. ................ | 713/153 |
| 2004/0213232 | A1 * | 10/2004 | Regan ............................ | 370/390 |
| 2004/0239376 | A1 * | 12/2004 | Haeffele ......................... | 327/94 |
| 2005/0226253 | A1 * | 10/2005 | Parker et al. ............. | 370/395.42 |
| 2006/0114831 | A1 * | 6/2006 | Buduma et al. ................ | 370/241 |
| 2006/0114915 | A1 * | 6/2006 | Kalkunte et al. .......... | 370/395.53 |

* cited by examiner

*Primary Examiner* — Ricky Ngo
*Assistant Examiner* — Dewanda Samuel

(57) ABSTRACT

One embodiment disclosed relates to a method of sampling network traffic. A data packet is received by a network device. Information is extracted from fields in the data packet, and a look-up word is created using the extracted information. A content addressable memory is searched for entries matching the look-up word. If a match is found, then a sampling circuit is queried, and a response is received therefrom. The data packet may be sent to a destination port. In addition, if the response from the sampling circuit indicates that the data packet is chosen to be mirrored, then the data packet may be also sent to a mirror port. Other embodiments are also disclosed.

14 Claims, 5 Drawing Sheets

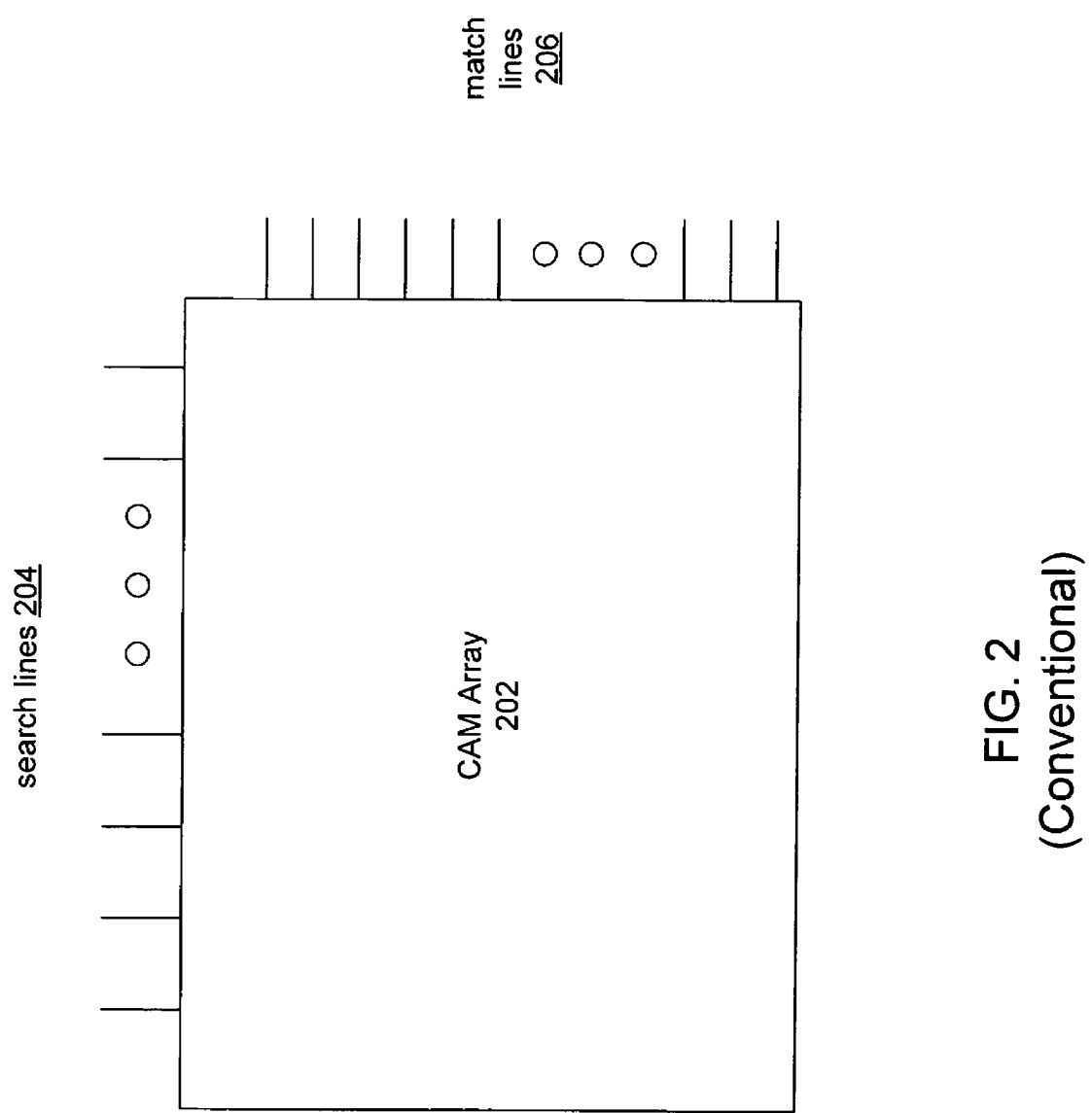
FIG. 2
(Conventional)

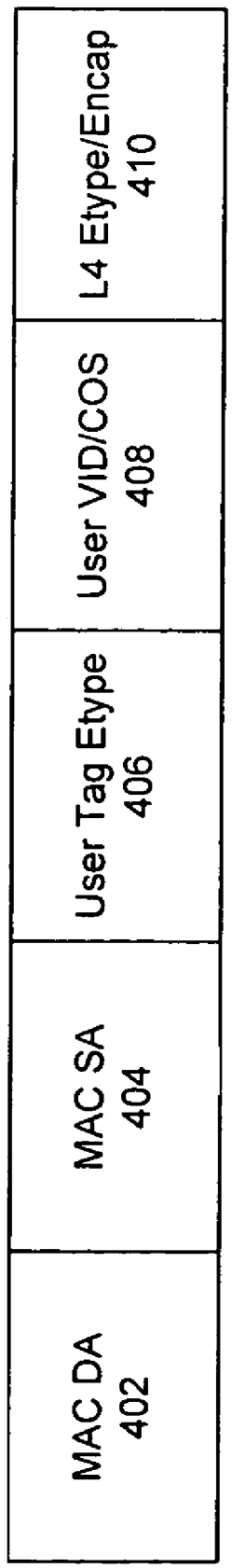
FIG. 4
(Conventional)

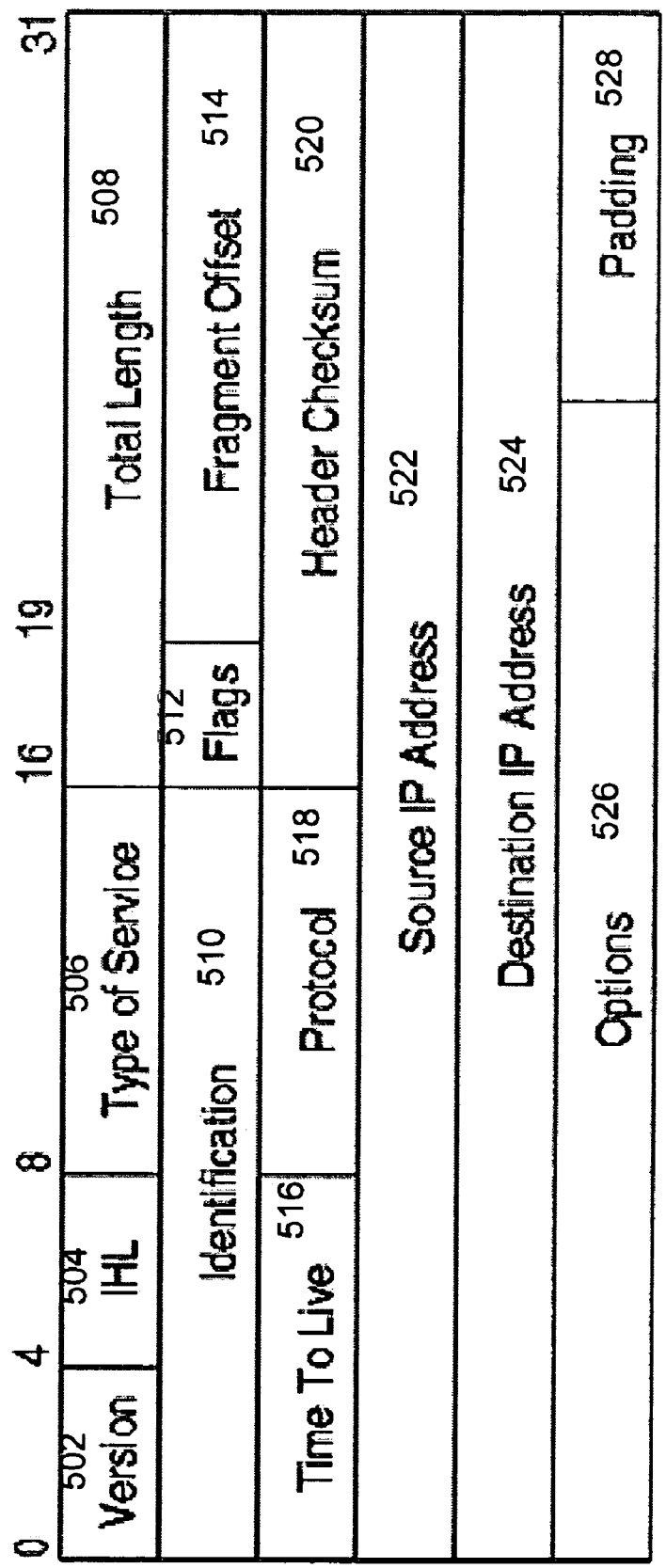
FIG. 5
(Conventional)

SAMPLING OF NETWORK TRAFFIC BASED ON CAM LOOKUP

BACKGROUND OF THE INVENTION

1. Field of the Invention

The present invention relates generally to networking and communications technology.

2. Description of the Background Art

Network traffic mirroring (or monitoring) is a process by which network traffic is sent to a mirror (or monitor) port or interface, in addition to the intended destination of the traffic. A network monitoring device or network analyzer may be attached to the mirror port/interface to detect problems in the network.

Conventional mirroring logic does not anticipate the port speed or capacity of the monitoring device. As such, the mirroring device may send more packets to the monitoring device than the monitoring device can handle. When the input buffer of the monitoring device overflows, the monitoring device may drop packets without regard to their importance or ordering. This may cause the monitoring device to obtain poorly distributed subsets of the data traffic that it wants to monitor.

It is desirable to improve networking and communications technology. In particular, it is desirable to improve apparatus and methods of mirroring network traffic.

SUMMARY

One embodiment disclosed relates to a method of sampling network traffic. A data packet is received by a network device. Information is extracted from fields in the data packet, and a look-up word is created using the extracted information. A content addressable memory is searched for entries matching the look-up word. If a match is found, then a sampling circuit is queried, and a response is received therefrom. The data packet may be sent to a destination port. In addition, if the response from the sampling circuit indicates that the data packet is chosen to be mirrored, then the data packet may be also sent to a mirror port.

Another embodiment of the invention relates to a networking device. A plurality of ports receives packets into the networking device and for transmits packets from the networking device, and an operating system controls the networking device. The networking device also includes a sampling circuit, a content addressable memory, and a mirroring module. The mirroring module is configured to extract information from header fields of the packet, to create a look-up word from the extracted information, to search the content addressable memory for any entries matching the look-up word, and to query the sampling circuit if a match is found.

Other embodiments are also disclosed.

BRIEF DESCRIPTION OF THE DRAWINGS

FIG. 2 is a diagram illustrating a CAM configuration.

FIG. 4 is a diagram depicting fields of a conventional MAC header.

FIG. 5 is a diagram depicting fields of a conventional IP header.

DETAILED DESCRIPTION

Figure 1:
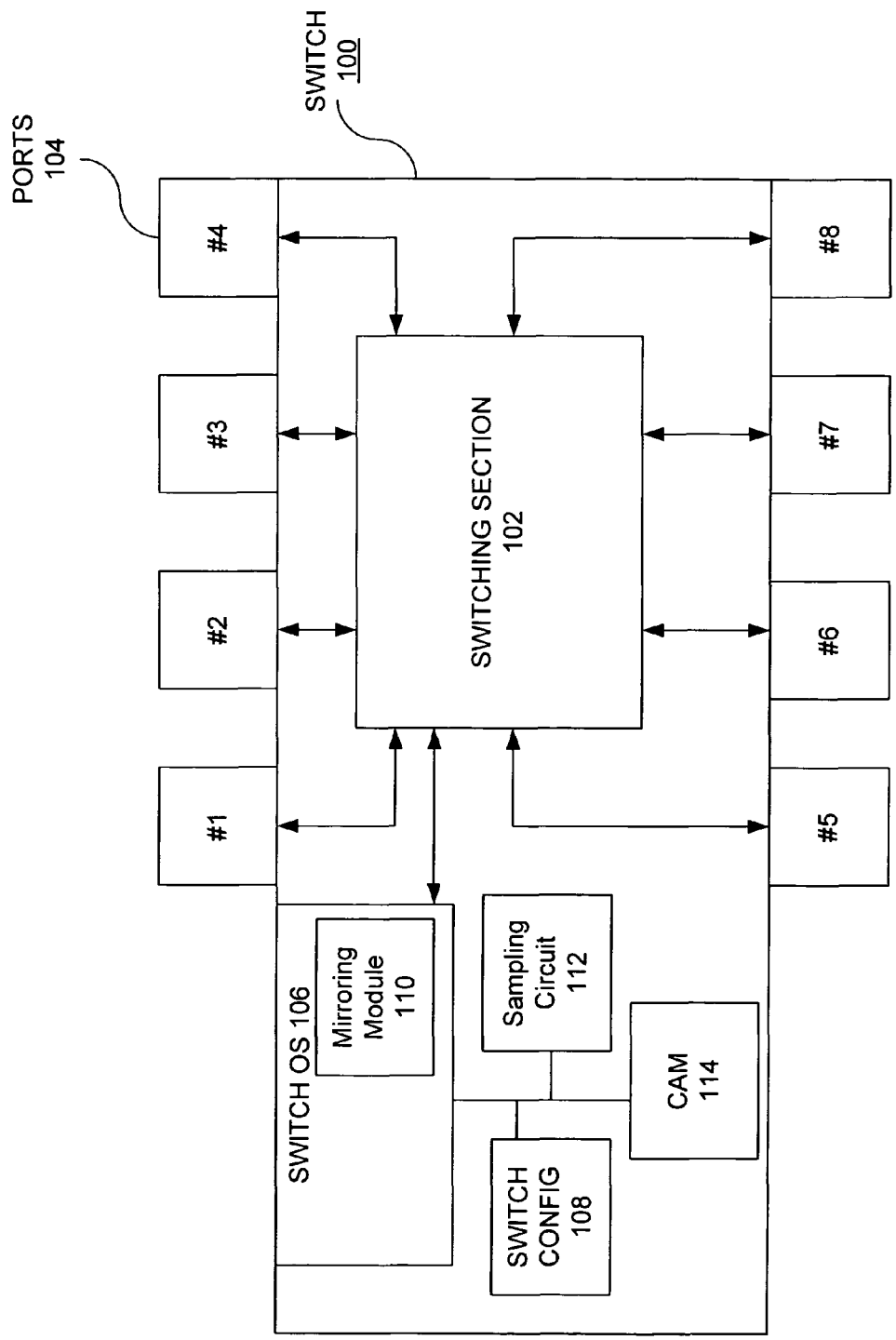
FIG. 1 is a schematic diagram illustrating a networking switch in accordance with an embodiment of the invention.

FIG. 1 is a schematic diagram illustrating a networking switch in accordance with an embodiment of the invention. The switch 100 includes a switching section 102, a plurality of switch ports 104, a switch operating system (OS) 106, a switch configuration 108, and a mirroring engine 110.

The switching section 102 is coupled to each of the ports 104. The switching section may include, for example, a switching core such as a crossbar switch or other circuitry, and makes connections between the ports 104 so that data frames can be transferred from one port to another port. Eight switch ports 104 are shown in this example. The ports 104 are shown as numbered, for example, as #1, #2, #3, #4, #5, #6, #7, and #8. Of course, other implementations may include any number of ports.

The switch OS 106 includes software routines used to control the operation of the switch 100. The switch configuration file 108 includes configuration information utilized by the switch OS 106. For example, the switch configuration file 108 may include selection criteria or selection parameters for packet mirroring.

In accordance with an embodiment of the invention, the switch OS 106 is configured with a mirroring module or engine 110. The mirroring module 110 is configured to extract selected portions of a network packet to create a look-up word. The look-up word may be passed to a content addressable memory (CAM) 114. The CAM 114 may be of a binary or ternary type.

Binary CAMs store and compare binary bits that may be either true or false (i.e. 1 or 0). Ternary CAMs store and compare bits that may be either true or false or "do not care" (i.e. 1 or 0 or X). An illustrative CAM configuration 200 is depicted in FIG. 2. Cells within a CAM array 202 may be arranged into word rows that may be matched or not matched by a look-up (search) word. The look-up word may be broadcast to rows of words via search lines 204, and an indication of whether the look-up word matches a word stored at a particular row may indicated by a signal on a match line 206 corresponding to the particular row.

If the look-up word matches one or more entries in the CAM 114, then a query may be made to a sampling circuit 112 to determine if the packet being processed is chosen to be sampled. The sampling circuit 112 may be configured to return a signal indicating whether or not a particular packet is to be sampled. Various types of sampling may be used, including random sampling and non-random types of sampling.

In one embodiment, different entries in the CAM 114 may point to different sampling circuits, each configurable to have a different probability of sampling. Alternatively or in addition, the circuitry may be configured such that several different CAM entries point to the same sampling circuit. This may advantageously save sampling resources or to group packets of a given class together.

Those data packets which both match an entry in the CAM 114 and are selected for sampling by the sampling circuit 112 are sent to a monitoring (mirror) port, in addition to being sent to the appropriate destination port.

Figure 3:
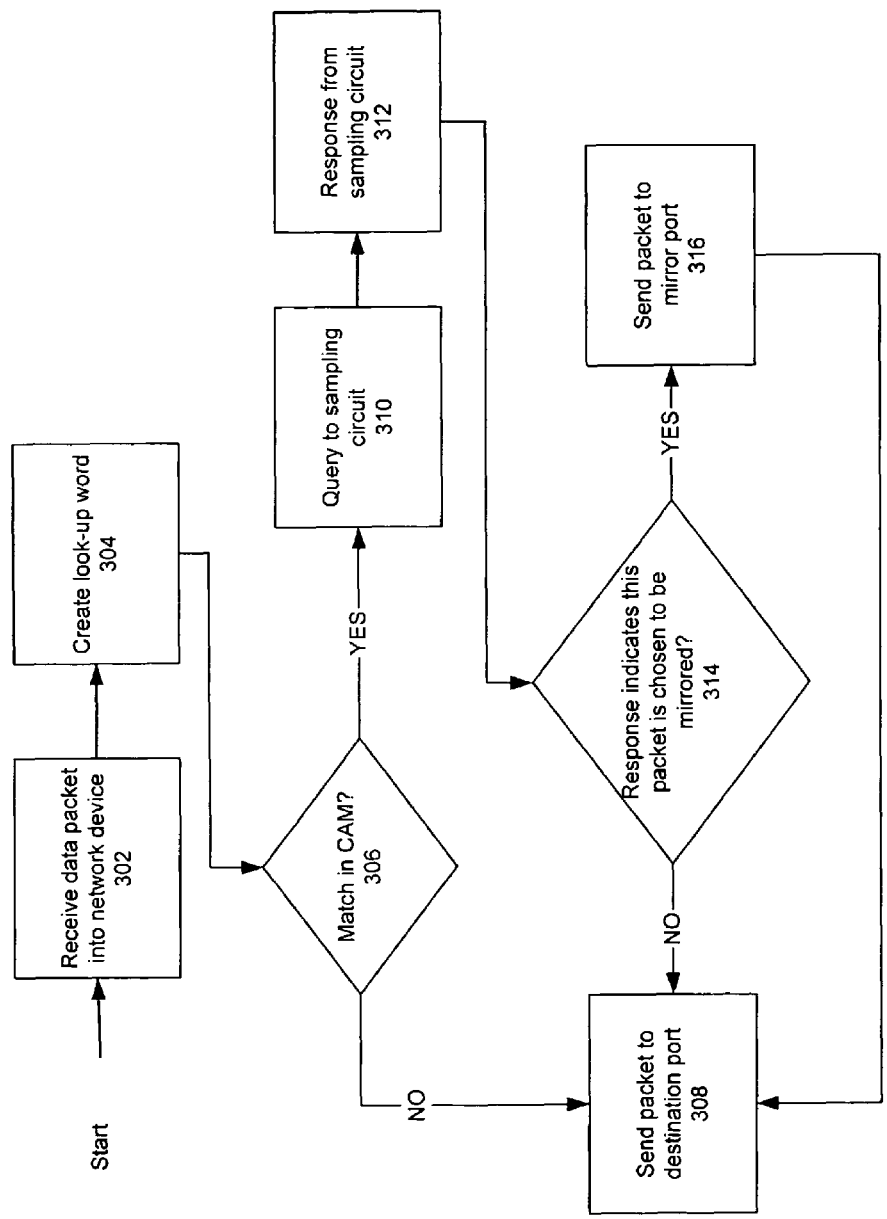
FIG. 3 is a flow chart depicting a method of sampling network traffic in accordance with an embodiment of the invention.

FIG. 3 is a flow chart depicting a method 300 of sampling network traffic in accordance with an embodiment of the invention. This method 300 starts when a data packet is received 302 into the network device. The network device may comprise, for example, a networking switch 100 as described above in relation to FIG. 1, or may comprise an alternative networking device, such as a router, or hub, or similar device.

For each packet received, a look-up word is created 304 from selected data from the data packet. The selected data may come from various fields of the packet such that those packets of interest are selected. For example, if it is desired to sample packets from a particular virtual local area network (VLAN), then the selected fields may include the optional VLAN identifier (VID)/cost of service (COS) field in a media access control (MAC) header. Multiple fields may be selected, and the information therein may be combined, so as to create 304 the look-up word. The selected fields may be, for example, from the fields in a MAC header, such as those depicted in FIG. 4. As another example, the selected fields may be from the fields in an internet protocol (IP) header, such as those depicted in FIG. 5. FIGS. 4 and 5 are discussed further below. More generally, any data from the packet, not just data from the MAC and IP headers, may be used to create 304 the look-up word.

A determination 306 may be then made as to whether the look-up word matches one or more entries in a CAM 114. As discussed above, the CAM 114 is configured to store words representing criteria for selecting packets of interest that are to be sampled.

If there is no match (i.e. the packet is not of a type of interest), then the packet is simply sent (switched) 308 to the appropriate destination port. The destination port being determined, for example, based on a destination address in the packet, as is known to those of skill in the art.

On the other hand, if a match is found (i.e. the packet is of a type of interest), then a determination may be made as to whether this specific packet is to be mirrored (sent to the monitoring device). This determination may be accomplished by sending a query 310 to a sampling circuit 112, and receiving a response 312 from the sampling circuit. In one embodiment, the sampling circuit 112 may comprise a random sampling circuit that responds with a random choice of whether a specific packet is to be mirrored. In another embodiment, the sampling circuit 112 may comprise a non-random type of sampling circuit that uses non-random criteria to determine whether a specific packet is to be mirrored.

If the response from the sampling circuit indicates 314 that the specific packet is not chosen to be mirrored, then the packet is simply sent (switched) 308 to the appropriate destination port. On the other hand, if the sampling circuit indicates 314 that the specific packet is chosen to be mirrored, then a copy of the packet is sent 316 to a pre-designated mirror (or monitor) port of the networking device. In addition, the packet is also sent (switched) 308 to the appropriate destination port.

FIG. 4 is a diagram depicting fields of an example MAC header 400. The illustrated MAC header 400 includes a user VLAN tag. A packet may have such a format, if so tagged. Other packets may have MAC headers without such an optional VLAN tag.

The depicted packet header 400 includes the following fields: a media access control (MAC) destination address (DA) 402; a MAC source address (SA) 404; a user ether type (etype) 406; a user VLAN identifier (VID)/class of service (COS) 408; a layer two (L2) etype/encapsulation 410; and other fields. A user VLAN tag comprises the user etype 406 and user VID/COS 408. As discussed above, data from one or more of these fields may be extracted so as to form a look-up word to select packets of interest for sampling.

FIG. 5 is a diagram depicting fields of a conventional IP header 500. The IP header 500 includes various fields, such as a version field 502, an Internet header length (IHL) 504, a type of service 506, a total length 508, an identification field 510, a flags field 512, a fragment offset 514, a time to live (TTL) 516, a protocol field 518, a header checksum 520, a source IP address 522, a destination IP address 524, options 526, and padding 528. As discussed above, data from one or more of these fields may be extracted so as to form a look-up word to select packets of interest for sampling.

In contrast to the above-disclosed embodiments, previous implementations of random sampling logic have generally been port-based or backplane-based. However, as port speeds and port densities increase, the number of samples in a small sampling window (for example, a window of one second) increases to a point that there are too many packets being mirrored to a monitoring device, such that the monitoring device becomes overwhelmed.

Also, port-based sampling may generate large numbers of uninteresting samples. The technique disclosed in the present application may be advantageously applied such that only packets of interest are sent to the monitoring device.

Furthermore, port-based sampling cannot deal effectively with the case where a single stream might enter different ports. The technique disclosed in the present application may be advantageously applied to sample such a single stream even if it arrives via multiple ports.

By mirroring a portion of network traffic, a network administrator may obtain a very accurate view over time of an aspect of a network being monitored. However, the view may be obscured and hindered by an overload of data that overflows the monitoring system such that the monitored traffic is poorly distributed and not representative. The disclosure of the present application may be advantageously applied to avoid such overloads by providing a smaller subset of well-distributed data to be monitored.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of sampling network traffic, the method comprising:
    receiving a data packet by a network device;
    extracting information from fields in the data packet by said network device;
    creating a look-up word by said network device using the extracted information, wherein the lookup word is formed using information extracted from at least one filed in a MAC header or IP header;
    searching a content addressable memory in said network device for entries matching the look-up word; and
    if a match is found, then querying a sampling circuit of said network device and receiving a response from the sampling circuit in which said response from said sampling circuit indicates whether said data packet is chosen to be mirrored.

2. The method of claim 1, further comprising:
sending the data packet to a destination port; and
if the response from the sampling circuit indicates that the data packet is chosen to be mirrored, then sending the data packet to a mirror port.

3. The method of claim 1, wherein the content addressable memory comprises a binary content addressable memory.

4. The method of claim 1, wherein the content addressable memory comprises a ternary content addressable memory.

5. The method of claim 1, wherein the sampling circuit comprises a random sampling circuit.

6. The method of claim 1, wherein the sampling circuit comprises a non-random sampling circuit.

7. A networking device comprising:
a plurality of ports for receiving packets into the networking device and for transmitting packets from the networking device;
an operating system for controlling the networking device;
a sampling circuit;
a content addressable memory; and
a mirroring module configured to extract information from header fields of the packet, to create a look-up word from the extracted information, to search the content addressable memory for any entries matching the look-up word, and to query the sampling circuit if a match is found, wherein the lookup word is formed using information extracted from at least one filed in a MAC header or IP header;
in which a response to said query from said sampling circuit indicates whether said data packet is chosen to be mirrored.

8. The networking device of claim 7, wherein a response to the query is received by the mirroring module from the sampling circuit, and wherein if the response from the sampling circuit indicates that the packet is chosen to be mirrored, then the packet is sent to a mirror port.

9. The networking device of claim 7, wherein the content addressable memory comprises a binary content addressable memory.

10. The networking device of claim 7, wherein the content addressable memory comprises a ternary content addressable memory.

11. The networking device of claim 7, wherein the sampling circuit comprises a random sampling circuit.

12. The networking device of claim 7, wherein the sampling circuit comprises a non-random sampling circuit.

13. An apparatus for minoring of network traffic, the apparatus comprising:
a plurality of ports configured to receive and send data packets;
means for obtaining information from fields in the data packet;
means for creating a look-up word using the extracted information;
means for matching entries in a content addressable memory with the look-up word; and
means for querying a sampling circuit and receiving a response from the sampling circuit, if a match is found; wherein the lookup word is formed using information extracted from at least one filed in a MAC header or IP header in which said response from said sampling circuit indicates whether said data packet is chosen to be mirrored.

14. The apparatus of claim 13, further comprising:
means for transmitting the data packet to a destination port; and
means for transmitting the data packet to a minor port if the response from the sampling circuit indicates that the data packet is chosen to be mirrored.

* * * * *

UNITED STATES PATENT AND TRADEMARK OFFICE
CERTIFICATE OF CORRECTION

PATENT NO.           : 8,050,185 B2
APPLICATION NO.      : 11/211198
DATED                : November 1, 2011
INVENTOR(S)          : Steven Glen Jorgensen et al.

It is certified that error appears in the above-identified patent and that said Letters Patent is hereby corrected as shown below:

In column 6, line 13, in Claim 13, delete "minoring" and insert -- mirroring --, therefor.

In column 6, lines 24-25, in Claim 13, delete "found; wherein" and insert -- found, wherein --, therefor.

In column 6, line 27, in Claim 13, delete "header" and insert -- header; --, therefor.

In column 6, line 33, in Claim 14, delete "minor" and insert -- mirror --, therefor.

Signed and Sealed this
Eleventh Day of September, 2012

David J. Kappos
*Director of the United States Patent and Trademark Office*